US009644644B2

(12) United States Patent
Weber et al.

(10) Patent No.: US 9,644,644 B2
(45) Date of Patent: May 9, 2017

(54) HYDRAULIC ACCUMULATOR IN FORM OF A BELLOWS ACCUMULATOR

(71) Applicant: HYDAC TECHNOLOGY GMBH, Sulzbach/Saar (DE)

(72) Inventors: Norbert Weber, Saarbruecken (DE); Herbert Baltes, Losheim (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 0 days.

(21) Appl. No.: 13/261,844

(22) PCT Filed: Oct. 29, 2012

(86) PCT No.: PCT/EP2012/004512
§ 371 (c)(1),
(2) Date: Apr. 15, 2014

(87) PCT Pub. No.: WO2013/064233
PCT Pub. Date: May 10, 2013

(65) Prior Publication Data

US 2014/0230939 A1 Aug. 21, 2014

(30) Foreign Application Priority Data

Nov. 5, 2011 (DE) ........................ 10 2011 117 752

(51) Int. Cl.
*F16L 55/04* (2006.01)
*F15B 1/10* (2006.01)

(52) U.S. Cl.
CPC ...... *F15B 1/103* (2013.01); *F15B 2201/3153* (2013.01); *F15B 2201/3156* (2013.01); *F15B 2201/40* (2013.01)

(58) Field of Classification Search
CPC ........................................................ F15B 1/103
USPC ...................................................... 138/30, 31
See application file for complete search history.

(56) References Cited

U.S. PATENT DOCUMENTS 2,411,315 A * 11/1946 Ashton ............................ 138/30
3,019,818 A * 2/1962 Everett ............................ 138/30
3,070,127 A * 12/1962 Gratzmuller .............. F15B 1/24
138/31
4,213,545 A * 7/1980 Thompson et al. ........ 222/386.5
4,691,739 A * 9/1987 Gooden ........................... 138/31
5,133,387 A * 7/1992 Pietrykowski et al. ......... 138/30
6,412,476 B1 * 7/2002 Thompson ........... B60K 15/077
123/516

(Continued)

FOREIGN PATENT DOCUMENTS

DE 1 425 538 1/1969
DE 102 53 012 A1 11/2003

(Continued)

*Primary Examiner* — Vishal Pancholi
(74) *Attorney, Agent, or Firm* — Wenderoth, Lind & Ponack, L.L.P.

(57) ABSTRACT

A hydraulic accumulator includes an accumulator housing (1), in which a bellows (21) having a selectable number of pleats (23) forms a mobile separation element between the gas side (25) and the fluid side (13). A distancing device (33) is arranged inside the accumulator housing (1), and is fluidically connected to the inside of the bellows (21) or abuts the bellows (21), forming an additional medium chamber.

12 Claims, 2 Drawing Sheets

(56) References Cited

U.S. PATENT DOCUMENTS

| | | | | |
|---|---|---|---|---|
| 6,502,828 | B1 * | 1/2003 | Sasaki | F15B 1/103 138/30 |
| 6,848,755 | B2 * | 2/2005 | Yuda | F15B 1/103 138/30 |
| 7,318,452 | B2 * | 1/2008 | Yoshihara | F15B 1/103 138/26 |
| 7,857,006 | B2 * | 12/2010 | Baltes et al. | 138/31 |
| 2004/0250866 | A1 * | 12/2004 | Bartsch | F15B 1/22 138/30 |
| 2009/0101222 | A1 * | 4/2009 | Baltes et al. | 138/30 |

FOREIGN PATENT DOCUMENTS

| | | | |
|---|---|---|---|
| DE | 102 33 481 | A1 | 2/2004 |
| DE | 10 2006 025552 | A1 | 12/2007 |
| GB | 603 363 | A | 6/1948 |
| JP | 57 098396 | U | 6/1982 |

* cited by examiner

HYDRAULIC ACCUMULATOR IN FORM OF A BELLOWS ACCUMULATOR

FIELD OF THE INVENTION

The invention relates to a hydraulic accumulator in the form of a bellows accumulator, having an accumulator housing with a bellows inside the housing. The bellows, has a preselectable number of pleats, and forms a movable separation element between the gas side and the fluid side inside the housing.

BACKGROUND OF THE INVENTION

Hydraulic accumulators having bellows serving as a movable separation element are known and are used in various technical fields, for example, in hydraulic brake systems for motor vehicles and in a wide variety of industrial hydraulic systems. For example, DE 10 2008 061 221 A1 discloses a bellows accumulator, in which a metal bellows is provided as the movable separation element between the gas side and the fluid side.

Bellows accumulators are characterized by many advantageous properties. For example, relatively great changes in volume of the media spaces in the accumulator housing can be implemented by expanding and contracting the bellows. Metal bellows provided as the movable separation element are also relatively robust with respect to alternating loads, such as those that may occur during operation, in particular in use as a pulsating damper. They also have good sealing properties without any diffusion losses. However, these properties must be balanced against the fact that metal bellows, which may be considered for use in hydraulic accumulators, are relatively expensive components, so that manufacturing the bellows accumulators is relatively cost intensive.

SUMMARY OF THE INVENTION

An object of the invention is to provide an improved bellows accumulator that can be manufactured inexpensively and economically.

According to the invention, this object is basically achieved by a bellows accumulator having a spacer device disposed inside the accumulator housing and in fluid connection with the interior of the bellows. The spacer device forms an additional media space or is adjacent to the bellows. A desired total volume of the working spaces in the accumulator housing can be implemented through pleated bellows having smaller dimensions and a smaller number of pleats. By the spacer device in addition to the volume of the working space forming the interior of the bellows in its working movements or lifting movements and depending on the geometry and the number of the bellows behaviors, this structure yields a significant reduction in manufacturing costs. Another advantage is that, due to the different choice of the size of the additional volume made available by the spacer device, different total volumes can be implemented with bellows of the same number of pleats. Due to the possibility of using similar bellows for hydraulic accumulators of different specifications, this structure opens the possibility of a further cost reduction due to the use of bellows, which bellows conform to a standard size and can thus be manufactured economically and inexpensively in larger numbers.

In advantageous exemplary embodiments, the spacer device is in the form of a pot mounted with a fluid-tight connection, with its opening on an open end of the bellows. A suitably selected depth of the pot can easily provide the desired additional volume in this way.

The arrangement may advantageously be made so that the pot is held immovably axially in the accumulator housing and forms the attachment point for the immovable end of the bellows at its opening.

Alternatively, however, the pot may be disposed as a movable element on the movable end of the bellows. Its immovable end may be secured on the accumulator housing in this case.

In both cases, the interior of the bellows may be assigned to the gas side in a particularly advantageous manner. The volume of the additional media space formed by the pot, together with the interior of the bellows, then forms the volume of the gas side. A large volume of working gas, accordingly, is available for operation of the hydraulic accumulator.

In preferred exemplary embodiments, with the pot disposed so that it is axially immovable, its bottom is at one end of the accumulator housing and has a gas filling connection for a working gas.

In exemplary embodiments, in which the pot is connected to the movable end of the bellows, the immovable end of the bellows may be secured on a housing part situated at one end of the accumulator housing, where a gas filling connection for working gas is provided.

In advantageous exemplary embodiments, a housing end part may be provided on the end of the accumulator housing opposite the end having the gas filling connection. This housing end part then delimits the fluid side, which fluid side is on the outside of the bellows and has a fluid connection.

The housing end part may especially advantageously form a stop limiting the movements of the bellows to a stroke corresponding to a predefined maximum volume comprised of the volume of the interior of the bellows and the additional volume of the pot.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 2:
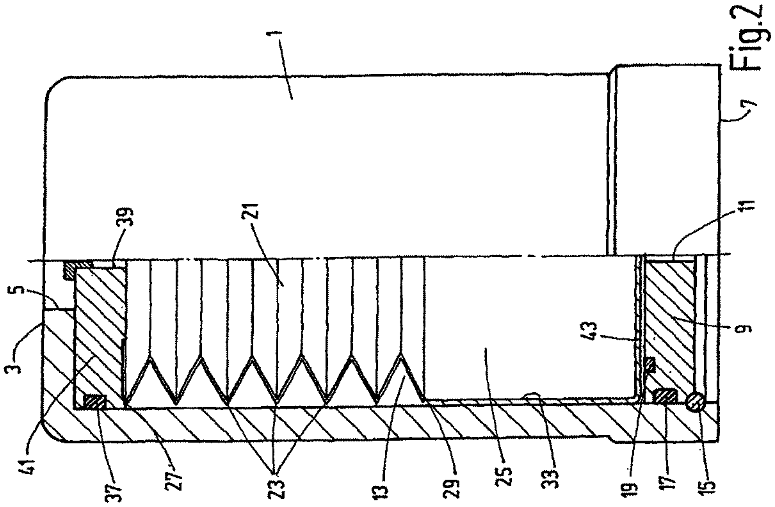
FIG. 2 is a side view, partially in section, of a hydraulic accumulator according to a second exemplary embodiment of the invention.
Figure 1:
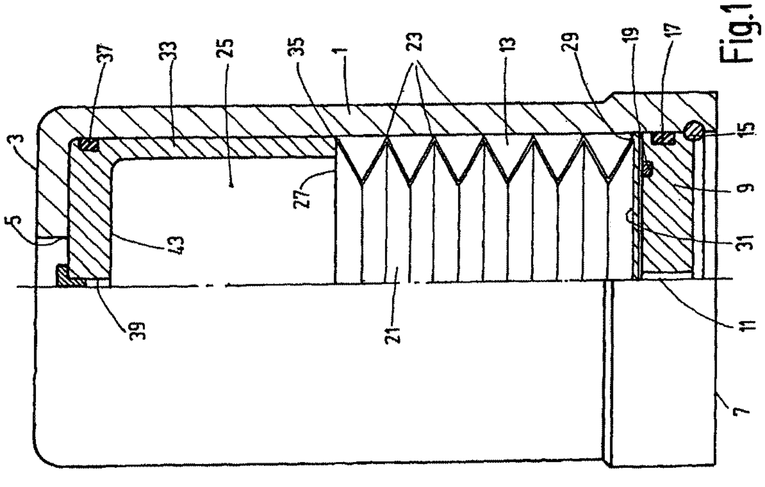
FIG. 1 is a side view, partially in section, of a hydraulic accumulator according to a first exemplary embodiment of the invention.

The exemplary embodiments illustrated in FIGS. 1 and 2 have an accumulator housing 1 that has a cylindrical interior and is closed on the end 3 (at the top of the drawing), except for a central opening 5. At the lower end 7, the accumulator housing 1 is closed by a housing end part 9 that has a centrally positioned fluid connection 11 leading to the fluid side or chamber 13 in the interior. The end part 9 is secured by a snap ring 15 and is sealed with respect to the accumulator housing 1 by a sealing element 17. The housing end part 9 is in the form of a flat plate with an elastomeric ring element 19 disposed in an annular groove in the plane facing the interior. The ring element 19 protrudes slightly above the plane of the end part 9.

In the interior of the accumulator housing 1, a metal bellows 21 having a predefined number of bellows pleats 23, only some of which are labeled in the figures, forms the separation element between the fluid side 13 and a gas side or chamber 25. The bellows 21 is open at the end 27 at the top in the drawing and is closed at its other lower end 29, such that in the exemplary embodiment in FIG. 1, an end part 31 is in the form of a thin plate connected to the last bellows pleat 23 on the movable end 29 of the bellows 21. In the exemplary embodiment of FIG. 1, the bellows 21 is connected at its other open end 27 to a spacer device, which is in the form of a pot 33 secured in the accumulator housing 1 so that it is immovable axially. The pot 33 is connected to the last pleat 23 of the bellows 21 at the edge 35 of its opening, so that the interior of the pot 33 is in fluid connection with the interior of the bellows 21, and thus, forms an extra volume in addition to the volume of the bellows 21. At the same time, the opening edge 35 of the pot 33 forms the locking point for the immovable end 27 of the bellows 21. The pot 33, which is sealed by a sealing element 37 on the outside with respect to the accumulator housing 1, has a gas filling connection 39 on the bottom or base 43 of the pot, which connection is accessible through the opening 5 in the accumulator housing 1. In the operating state illustrated in FIG. 1, in which a prestressing pressure prevails on the gas side 25, and thus, inside the pot 33 and in the interior of the bellows 21, and the fluid side 13 is pressureless, the housing end part 9 forms a stop to limit the stroke for the end part 31 on the movable end 29 of the bellows 21. The ring element 19 on the end part 9 then forms a flexible contact point.

The example of FIG. 2 differs from the prior art inasmuch as the immovable open end 27, which is at the top in the figure, is no longer connected to the spacer device. Instead, open end 27 is secured on a housing part 41 situated at the upper end 3 of the accumulator housing 1. As the pot 33 of the first exemplary embodiment housing part 41 is sealed by a sealing element 37. In a manner similar to that with the pot 33 of the first exemplary embodiment, a gas filling connection 39 is accessible through the opening 5 and is situated in the housing part 41 in its central part. Unlike the example from FIG. 1, a pot 33 serving as the spacer device is not mounted on the immovable end 27, but is on the movable end 29 of the bellows. The pot 33, as a component that is movable with the bellows 21, is designed with thin walls and comes to rest against the flexible ring element 19 of the housing end part 9 with the pot bottom 43 at the maximum stroke of the bellows 21 to limit the stroke.

Figure 3:
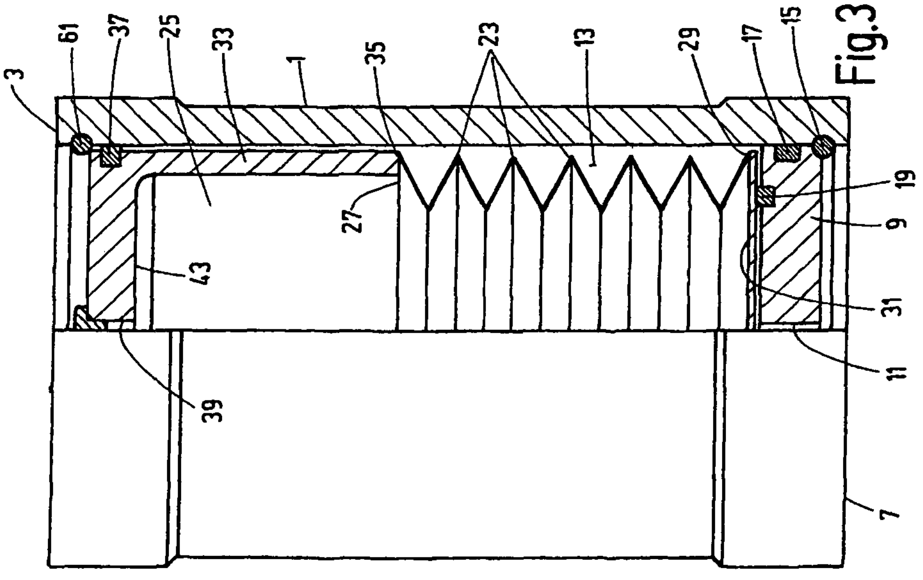
FIG. 3 is a side view, partially in section, of a hydraulic accumulator according to a third exemplary embodiment of the invention.

The exemplary embodiment of FIG. 3 differs from the example of FIG. 1 only inasmuch as the accumulator housing 1 is in the form of a tube, which is continuous on the inside from the lower end 7 to the upper end 3. In the first exemplary embodiment of FIG. 1, the pot 33 forming the additional volume of the bellows 21 is supported on the closed upper end 3 of the accumulator housing 1. In the example of FIG. 3, the pot 33 is secured by a snap ring 61 on the upper open tube end 3 of the accumulator housing 1.

Figure 4:
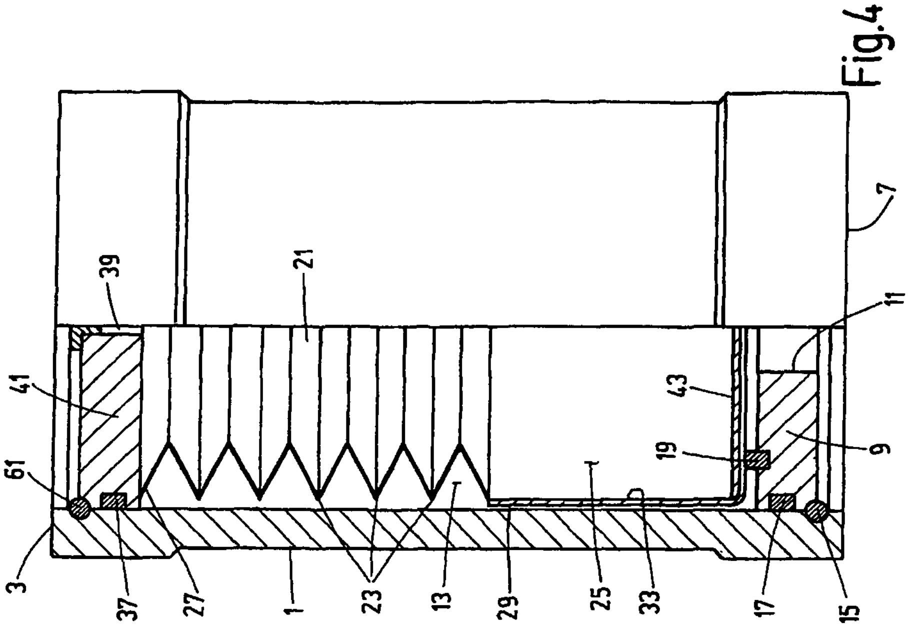
FIG. 4 is a side view, partially in section, of a hydraulic accumulator according to a fourth exemplary embodiment of the invention.

The example of FIG. 4 corresponds to the exemplary embodiment of FIG. 2, except for the fact that the accumulator housing 1 is again designed as a tubular body. Accordingly, the housing part 41, which is connected to the immovable end 27, is secured axially on the open tube end 3 of the accumulator housing 1 by a snap ring 61.

Manufacturing the accumulator housing 1 from a tube body permits a particularly simple, economical and inexpensive production of the bellows accumulator.

Hydraulic accumulators of various specifications according to the invention can be designed with bellows 21 having the same number of bellows pleats 23, by preselecting a minimum volume through the choice of the depth of the respective pot 33. This volume then corresponds essentially to the volume of the pot 33 with the bellows 21 compressed. On the other hand, the maximum volume of the other media space, which is on the outside of the compressed bellows 21, is predetermined through the choice of the axial length of the accumulator housing 1.

While various embodiments have been chosen to illustrate the invention, it will be understood by those skilled in the art that various changes and modifications can be made therein without departing from the scope of the invention as defined in the claims.

The invention claimed is:

1. A hydraulic accumulator, comprising:

an accumulator housing having a gas chamber and a fluid chamber;

a bellows with a preselected number of pleats located in said accumulator housing and forming a movable separation between said gas chamber and said fluid chamber, said bellows having an interior and an open end; and a spacer device being a separate element being disposed in said accumulator housing in an axially immovable position and being in fluid communication with said interior of said bellows, said spacer device being a pot with a pot opening on said open end of said bellows with a fluid-tight connection between said pot and said bellows, said pot having a pot interior, being defined by a side wall only extending perpendicularly from periphery of a flat base, forming a part of said gas chamber and forming a minimum volume of said gas chamber with said bellows being minimum volume of said gas chamber is selected by selecting a depth of said pot, said side wall being integral with said flat base, said flat base extending perpendicularly to a longitudinal axis of said accumulator housing minimum volume of said gas chamber is selected by selecting a depth of said pot.

2. A hydraulic accumulator according to claim 1 wherein said pot is secured to an immovable end of said bellows at said pot opening.

3. A hydraulic accumulator according to claim 1 wherein said base of said pot is situated at a first end of said accumulator housing and has a gas filling connection for a working gas.

4. A hydraulic accumulator according to claim 3 wherein a housing fluid end part is on a second end of said accumulator housing opposite said first end, comprises a fluid connection, and borders said fluid chamber outside of said bellows.

5. A hydraulic accumulator according to claim 4 wherein said housing fluid end part forms a stop limiting movements of said bellows to a stroke corresponding to a predefined maximum volume of said interior of said bellows plus said pot interior.

6. A hydraulic accumulator according to claim 5 wherein said accumulator housing comprises a bellow tube with open opposite ends, with said pot and said housing fluid end part being connected to said open opposite ends of said tube by snap rings.

7. A hydraulic accumulator, comprising:

an accumulator housing having a gas chamber and a fluid chamber;

a bellows with a preselected number of pleats located in said accumulator housing and forming a movable separation between said gas chamber and said fluid chamber, said bellows having an interior and an open end; and a spacer device being a separate element being disposed in said accumulator housing in an axially immovable position and being in fluid communication with said interior of said bellows, said spacer device being a pot with a base, a cylindrical side wall extending perpendicularly from said base and a port opening on an end of said side wall remote from said base and on said open end of said bellows with a fluid-tight connection between said pot and said bellows, said pot having a pot interior being defined solely by an inside surface of said side wall and an inside surface of said base forming a part of said gas chamber and forming a minimum volume of said gas chamber solely by an axial length of said side wall when said bellows is compressed to a maximum extent, said side wall being integral with said base, said base extending perpendicularly to a longitudinal axis of said accumulator housing;

whereby, for a given number of said pleats of said bellows, the minimum volume of said gas chamber is selected by solely selecting said axial length of said side wall of said pot.

8. A hydraulic accumulator according to claim 7 wherein said pot is secured to an immovable end of said bellows at said pot opening.

9. A hydraulic accumulator according to claim 7 wherein said base of said pot is situated at a first end of said accumulator housing and has a gas filling connection for a working gas.

10. A hydraulic accumulator according to claim 9 wherein a housing fluid end part is on a second end of said accumulator housing opposite said first end, comprises a fluid connection, and borders said fluid chamber outside of said bellows.

11. A hydraulic accumulator according to claim 10 wherein said housing fluid end part forms a stop limiting movements of said bellows to a stroke corresponding to a predefined maximum volume of said interior of said bellows plus said pot interior.

12. A hydraulic accumulator according to claim 11 wherein said accumulator housing comprises a bellow tube with open opposite ends, with said pot and said housing fluid end part being connected to said open opposite ends of said tube by snap rings.

* * * * *